United States Patent Office.

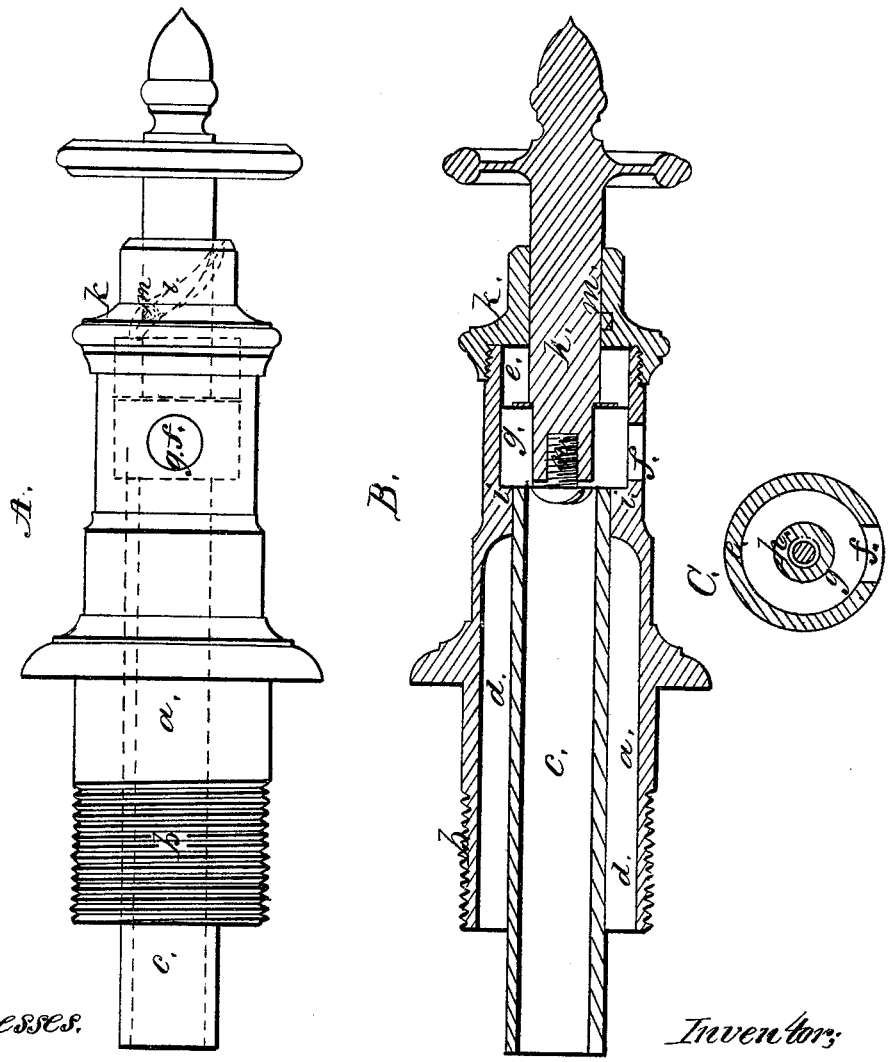

ANDREW J. MORSE, OF BOSTON, MASSACHUSETTS.

Letters Patent No. 91,152, dated June 8, 1869.

IMPROVEMENT IN SIRUP-COCK.

The Schedule referred to in these Letters Patent and making part of the same.

*To all whom it may concern:*

Be it known that I, ANDREW J. MORSE, of Boston, in the county of Suffolk, and State of Massachusetts, have invented an Improved Sirup-Cock; and I do hereby declare that the following, taken in connection with the drawings which accompany and form part of this specification, is a description of my invention, sufficient to enable those skilled in the art to practise it.

The invention relates to the construction and arrangement of the valves of that class of sirup-cocks used in connection with soda-apparatus.

One of this class of cocks may be seen in the patent granted to me, October 25, 1864, and my present invention is shown, in the accompanying drawings, as applied to a sirup-cock or faucet, of the general description shown in such patent.

The invention consists in the employment of a cylindrical valve, preferably formed of caoutchouc, or other elastic material, and fitting into the faucet-tube, or the valve-chamber thereof, said valve having a compound rotative and end movement imparted to it, by which movement it is caused to open and close an outlet-orifice, through the side of the tube, the cylindrical surface forming the valve.

In the drawings representing the invention—

A shows an under-side view.

B, a longitudinal section.

C, a cross-section through the valve and the eduction-orifice.

$a$ denotes the body of the faucet, the screw-threaded end $b$ of which is applied to the ice-containing and the sirup-can-containing case, this particular kind of faucet having an interior sirup-tube, surrounded by a refrigerating-chamber, $d$, this chamber $d$ opening directly from the ice-chamber of the soda-apparatus.

$e$ denotes the valve-chamber, which is cylindrical, and in line horizontally with the tube $a$, the eduction-orifice $f$ opening from the bottom of the valve-chamber, as seen at B and C.

$g$ denotes the valve, fixed upon the end of the valve-spindle $h$, cylindrical in shape, and fitting into and sliding in the chamber $e$, as will be readily understood from the drawing at B.

When slid up against the valve-seat $i$, the side of the valve covers the eduction-orifice, as seen at A and B, and packs the same tightly upon said orifice, while, when the valve is moved to the opposite end of the valve-chamber, the orifice is uncovered, and the sirup flows freely through the same.

To render the valve enduring and of easy movement, its endwise movement is imparted to it by giving to it a compound rotative and longitudinal motion, as follows:

The valve-spindle $h$ passes through a cap, $k$, and, in one side of the bore through this cap, is a helically-formed groove, $l$, into which projects a pin, $m$, fixed to the valve-spindle.

As the valve-spindle is rotated, this pin, working in its groove, will cause the spindle to move outwardly or inwardly, thus carrying the valve off from, or up to and over the orifice $f$.

The elasticity of the valve causes it to press tightly over the orifice when the faucet is closed, and, as it wears, it may be expanded by turning up the screw $n$ slightly, the valve being made to project slightly beyond the spindle, and the flange of the screw bearing upon the end of the valve, or upon a washer placed between the head of the screw and the valve.

To bring a new surface against the valve-opening, the valve may be turned upon the spindle by loosening the screw, said screw keeping it from turning when screwed up against the valve.

It will be obvious that this construction not only furnishes a valve, by which the sirup-orifice can be readily kept at all times impervious when not open, but that the valve can be very easily operated, and is inexpensive and enduring.

I claim the cylindrical elastic valve, the curved surface of which impinges against the inner side of the faucet-tube, and covers and uncovers the eduction-orifice, the elasticity of the valve permitting its expansion, and enabling it to be suitably expanded, at will, when worn, and the valve, when operated, having an endwise and rotative movement, substantially as described.

ANDREW J. MORSE.

Witnesses:
WM. F. MORSE,
FRANCIS GOULD.